United States Patent Office 3,459,725
Patented Aug. 5, 1969

3,459,725
HIGH MOLECULAR WEIGHT UNSATURATED HYDROCARBON HOMOPOLYMERS AND PROCESS FOR PREPARING THEM
Giulio Natta, Gino Dall'Asta, and Giorgio Mazzanti, Milan, Italy, assignors to Montecatini Edison S.p.A., Milan, Italy
No Drawing. Filed Jan. 15, 1965, Ser. No. 425,956
Claims priority, application Italy, Jan. 17, 1964, 1,071/64
Int. Cl. C08f 5/00
U.S. Cl. 260—93.1                     24 Claims

ABSTRACT OF THE DISCLOSURE

New high molecular weight homopolymers of cycloolefins containing from 7 to 12 atoms in the ring (e.g., cycloheptene; cyclooctene; cyclododecene), characterized in having the structure of polyalkenamers in which the double bonds are substantially of the trans type, and in being crystalline under normal conditions without having been mechanically treated to induce crystallization, are obtained by polymerizing the cycloolefins in contact with catalysts prepared from transition metal salts and organometallic compounds or hydrides of Group II or Group III metals.

PRIOR DISCLOSURES

In co-pending patent application Ser. No. 339,455, filed Jan. 22, 1964, homopolymers of cyclopentene having a structure similar to that of the polymers according to the present invention were described. These cyclopentene homopolymers were obtained by processes similar to those described herein.

THE PRESENT INVENTION

The present application therefore is a continuation-in-part of the said co-pending application, even though it was not possible to foresee the behavior of these cyclic-olefins (e.g., cycloheptene, cyclooctene-cis or cyclopentene and the higher cyclic olefins of this invention).

As far as we know, the polymerization of higher olefins, such as cycloheptene, cyclooctene-cis, and of cyclododecene to linear polymers by opening of the ring has never been effected heretofore. Moreover, polymers having the structure and characteristics of the products herein disclosed have never been produced.

An object of the present invention therefore are these new high molecular weight homopolymers, characterized by a substantially linear structure of the polymer chains, by the presence of olefinic unsaturations in each monomer unit, having a head-to-tail enchainment, and which exhibit crystallinity without being subjected to special treatments, such as stretching for orientation, to induce crystallization.

Another object of the present invention are the new polymers in which the double bonds have a high degree of stereoregularity, that is, where essentially all the double bonds are, e.g. of the trans type.

A further object of the present invention are the processes for obtaining the polymers by polymerization of cycloolefins with 7 to 12 carbon atoms, more particularly of cycloheptene, cyclooctene-cis and cyclododecene, in the presence of a specific catalytic system.

Another object of the present invention is the various applications of these polymers in the field of elastomers and vulcanized products.

These and other objects of the invention will become apparent from a further and more detailed description, which follows.

It has now been found that cycloolefins containing from 7 to 12 carbon atoms in the ring (e.g. cycloheptene, cyclooctene-cis and cyclododecene) can be homopolymerized by opening of the ring and maintaining of the olefin double bond contained in the monomers.

The polymerization of these cycloolefins such as cycloheptene, cyclooctene-cis and cyclododecene by opening of the cycloolefin rings can be carried out under such moderate temperature conditions that a thermal decomposition of the cycloheptene, cis cyclooctene and cyclododecene ring does not occur.

The monomer units are contained in these homopolymers practically entirely in the form of units of heptenamers, octenamers and dodecenamers, respectively, in accordance with the nomenclature proposed by M. L. Huggins, J. Polymer Science, 8 (1952), page 257.

The polymers obtained according to the invention therefore essentially correspond to the following general formula:

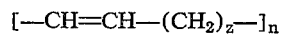
$$[-CH=CH-(CH_2)_z-]_n$$

in which $z$ is a whole number from 5 to 10 and $n$ is the average degree of polymerization.

The fact that cycloolefins with more than 4 carbon atoms in the ring do polymerize by opening of the ring is all the more surprising, if we consider the remarkable stability of these compounds. This polymerization is based on the breaking of a simple carbon-to-carbon bond.

Moreover, these cyclic olefins of from 7 to 12 carbon atoms, such as cycloheptene, cyclooctene-cis and cyclododecene, in contrast with lower cycloolefins (cyclopropene, cyclobutene and, to a lesser extent, cyclopentene) do not show any appreciable annular tension which could favor this breaking.

It was not expected that linear polyolefins, such as polyheptenamers, polyoctenamers, and polydodecenamers having sterically regular double bonds (of the trans type) could be obtained from cyclic olefins, such as cycloheptene, cyclooctene-cis and cyclododecene, respectively. The cycloheptene and cis-cyclooctene rings contains a double bond of the cis type and the formation of a polymer containing trans double bonds involves the simultaneous isomerization of the double bond from cis to trans.

By suitable selection among the catalysts which will be described in detail hereinbelow and by operating under the particular conditions specified hereinbelow, it is possible to prepare polyheptenamers and polyoctenamers in which substantially all the double bonds have the same structure, e.g., all trans or all cis.

These polymers can therefore be defined as trans polyheptenamers or trans polyoctenamers or cis polyoctenamers or trans polydodecenamers having an essentially stereoregular structure.

Due to this high steric regularity these polymers generally have a high degree of crystallinity as shown by X-ray examination, described in detail hereinbelow.

The homopolymers of the present invention, whether or not they have a high steric regularity of the double bond, are in general white solids after purification, having an elastomeric or fibrous consistency which are not at all, or scarcely, tacky; in the exceptional case of low molecular weight products they have a waxy consistency.

The average molecular weights of these products is usually higher than a few thousand, but can also exceed an average molecular weight of one million; the preferred products are those having average molecular weights between 10,000 and 500,000. Their intrinsic viscosities, as determined in toluene at 30° C., are between 0.2 and 8 (100 ml./g.). In many instances, however the intrinsic viscosity may be outside of this range.

The homopolymers of this invention are soluble in various solvents. These solvents include aromatic solvents e.g., benzene and toluene, and chlorinated hydrocarbons such as chloroform and carbon tetrachloride. They are partially soluble in aliphatic or naphthenic hydrocarbons such as n-heptane and Decalin.

They are insoluble in alcohols (methanol and ethanol), ketones (acetone, methylethyl ketone), ethers (diethyl ether, tetrahydrofurane, dioxane) and in various other solvents.

The polymers having a high degree of stereoregularity have a lower solubility (as regards both the amount of polymer soluble in a given solvent and the range of solvents which dissolve the polymer).

The solubility of the polymers of the present invention can be reduced or lost due to the formation of cross-linking deriving from the presence of double bonds in the macromolecular chains. These phenomena are particularly favored by the presence of several factors, such as residues of the catalysts used for their preparation, by high temperature and by the exposure to air, oxygen and light.

However, if the homopolymers are first carefully purified from the catalyst residue and then are subjected to the air and light, they are stable at room temperature and do not undergo alterations even after a prolonged period of time. Small amounts of antioxidants such as phenyl-beta-naphthylamine or hydroquinone prevent cross-linking and thus stabilize the polymer against light and weathering. The amount of antioxidant will range from about 1 to 5 parts by weight per thousand parts by weight of polymer.

Homopolymers which have an essentially regular steric structure, can be characterized by an infrared absorption spectra. These spectra make it possible to attribute a special chemical structure to the polymers of the invention, namely the structure of polyheptenamers or polyoctenamers with an essentially linear head-to-tail enchainment.

The infrared spectra also make it possible to determine the degree of steric regularity. A rather wide band at 13.8–13.9 microns and a band at 7.1 microns shows the presence of cis double bonds; a rather narrow band at 10.35 microns shows the presence of trans double bonds. In some polymers there is only the band at 10.35 microns while that at 13.8–13.9 microns is practically absent. These polymers therefore have a high degree of stereoregularity of the trans type.

Bands attributable to other types of double bonds (such as vinyl, vinylidene, allene, conjugated double bonds) are absent or are present in such a small amount that they hardly can be observed in the infrared spectrum.

The bands characteristic of cyclic structures originated by polymerization of the cyclic olefin (cycloheptene, cis-cyclooctene, or cyclododecene) by opening of the double bond and maintenance of the ring are substantially absent. In some cases, we have found a very small amount of cyclic units of this type.

Polymers having the structure of trans polyheptenamer and those having the structure of trans polyoctenamer (in the solid state), show a characteristic crystallinity band in the zone of 9.3–9.4 microns in the infrared spectrum.

The essentially linear head-to-tail polymers of cycloheptene, of cis-cyclooctene and of cyclododecene having a high degree of steric regularity of the trans type of their double bonds, give spectra characteristic of powders and of oriented fibers, upon examination by X-rays.

In the powder spectra, characteristic diffraction lines can be observed. The main diffraction lines correspond to the following lattice distances and had the following relative intensities: trans polyheptenamer—4.13 A. (s.s.), 3.72 A. (m.s.), 2.515 A. (m.), 2.217 A. (w.), 2.067 A. (w.); trans polyoctenamer—4.37 A. (m.s.), 4.13 A, (w.), 3.80 A. (m.); trans polydodecenamer—4.48 A. (v.w.), 4.17 A. (s.), 3.78 A. (m.s.), 3.03 A. (v.v.w.), 2.528 A. (m.w.), 2.253 A. (m.); in which ss.=very strong, s.=strong, m.s.=medium strong, m.=medium, m.w.=medium weak, w.=weak, v.w.=very weak, v.v.w.=very very weak.

The fiber spectra obtained by extrusion of the polymer and orientation of the filament by stretching and successive annealing in water at 30° C., made it possible to determine the identity period of the said two polymers:

trans polyheptenamer: crystallographic identity period along the fiber axis=17.0±0.3 A.

trans polyoctenamer: crystallographic identity period along the fiber axis=9.9±0.3 A.

The homopolymers of the present invention can be further characterized in that they can be vulcanized due to the presence of numerous double bonds in the polymer chains. The rate of cross-linking during the vulcanization and the degree of cross-linking obtainable depend mainly on the type and amount of vulcanizing agent used. All the conventional vulcanizable methods used for vulcanizing natural rubber and synthetic rubbers may be used for the polymers of this invention. More particularly, the vulcanization agents used for conjugated dienes such as sulfur and other known accelerators can be adopted for vulcanizing the homopolymers and the copolymers of the present invention.

The catalysts that can be used in the homopolymerization processes of the present invention are prepared by mixing certain transition metal compounds with specific organometallic compounds or metalhydrides in an inert solvent. The transition metals, whose salts are suitable for this purpose, are those belonging to Groups IV–B and VI–B of the Mendeleef Periodic Table. Molybdenum and tungsten salts are particularly effective. The tungsten salts are in general are more effective than molybdenum salts. Typical examples of molybdenum and tungsten salts to be used in the preparation of the catalyst for this invention include: $MoCl_3$, $MoCl_5$, $MoF_6$, $MoF_5Cl$, $MoO_2$(acetylacetonate)$_2$, $MoCl_2$(phenolate)$_3$, $WCl_5$, $WCl_6$, $WF_6$, $WOCl_4$, $W(OC_6H_5)_6$, $W_2Cl_6$(pyridine)$_3$. Particularly suitable are $WCl_6$, $WOCl_4$ and $MoCl_5$.

The organometallic compounds and metal hydrides suitable for preparing catalysts according to the invention are those of Groups II and III of the Mendeleef Periodic Table. Among these particularly suitable for preparing the catalysts which polymerize cyclic olefins such as cycloheptene, cyclooctene-cis and cyclododecene are the organometallic compounds and metalhydrides of beryllium, magnesium, calcium, zinc, and aluminum.

Typical examples of metallorganic and metal hydride compounds which can be used in the preparation of the catalysts according to the invention include: $Be(C_2H_5)_2$; $Mg(C_6H_5)_2$; $MgC_6H_5Br$, $CaH_2$; $CaHC_2H_5$; $Zn(C_2H_5)_2$; $ZnC_2H_5Cl$, $Al(C_2H_5)_3$; $Al(i-C_4H_9)_3$; $Al(n-C_6H_{13})_3$; $Al(C_6H_5)_3$; $Al(C_2H_5)_2Cl$, $Al(C_2H_5)Cl_2$, $Al(C_2H_5)_2F$, $Al(C_2H_5)_2Br$, $AlH(i-C_4H_9)_2$; $AlH_3$; $Al$(isopropenyl)$_3$; $Al(C_2H_5)_2OC_2H_5$.

The organometallic compounds and the metal hydrides can be complexed with electron-donor compounds (weak Lewis bases) such as ethers, amines, phosphines, "onium" salts, or alkaline halides.

Particularly good results were obtained by using organometallic aluminum compounds such as $Al(C_2H_5)_3$, $Al(i-C_4H_9)_3$, $Al(n-C_6H_{13})_3$, and $Al(C_2H_5)_2Cl$. Although the molar ratio of transition metal salt to organometallic or metalhydride compound is not a limiting parameter, it is preferred that a ratio between 1:0.5 and 1:100 be used.

In the instances where the organometallic or metal hydride have a lower alkylating power, such as $Al(C_2H_5)Cl$, $Al(C_2H_5)Cl_2$, $Al(C_2H_5)_2Br$, $AlH(i-C_4H_9)_2$, and $BeCH_3Cl$, it is preferred to use higher molar ratios of the two catalyst components. With these compounds good results are obtained by operating with molar ratios between 1:3 and 1:20. However, when the organometallic or metalhydride compounds have a higher alkylating power, such as $Al(C_2H_5)_3$, $Al(n-C_6H_{13})_3$, and $Be(C_2H_5)_2$, lower molar ratios are preferably selected. With these compounds, good results were obtained by operating with molar ratios between 1:1 and 1:5.

The molar ratios of cycloolefin to transition metal salt are selected in the range up to 3000:1. It was found, however, that particularly satisfactory results are obtained by operating in the range of molar ratios up to about 1000:1.

It can be observed that for a wide range of molar ratios, the higher the ratio between cycloolefin and transition metal salt, the higher the conversion to heptenamer or to octenamer. Thus, e.g., a higher polymer amount is obtained by operating with a cycloolefin/WCl$_6$ molar ratio of 300:1 than with a molar ratio of 20:1, other conditions being the same.

The catalytic mixture obtained from a molybdenum or tungsten salt and an organometallic or metal hydride compound as specified above, is preferably prepared not long before starting the polymerization, at a temperature which is preferably equal to or lower than the polymerization temperature.

The preparation of the catalytic mixture may be carried out in the presence of an inert diluent, such as an aliphatic, cycloaliphatic or aromatic hydrocarbon (e.g., n-heptane, petroleum ether, cyclohexane, benzene, toluene). In some instances, a very small amount of these inert diluents are conveniently used. However, in many cases it is convenient to use no inert diluent and to carry out the mixing of the catalyst components in the presence of the monomer alone, at a temperature preferably lower than, or equal to, the polymerization temperature. By operating in this way, it is possible to obtain a higher rate of homopolymerization and a higher conversion into polymer of the monomer.

The catalyst may be used as obtained by simply mixing its components or after it has first been applied to a support. The preferred supports include a metal oxide which is stable in the presence of the reactants used. Alumina is particularly suitable as support.

With respect to the diluents, it is necessary to use diluent in the polymerization, and many of the above mentioned inert hydrocarbons were found to be satisfactory. However, it may be preferred in some instances to avoid the use of extraneous diluents and to carry out the polymerization by using the monomer per se as the diluent.

The homopolymerization temperatures at which this reaction occurs range between $-80°$ C. and $+100°$ C., and more preferably between $-50°$ C. and $+60°$ C. Particularly good results are obtained at temperatures between $-30°$ C. and $+30°$ C.

The polymerization reaction may be carried on until almost all of the monomer is polymerized.

However, since cross linking is then favored, which makes the polymer substantially insoluble, it is preferred to stop the polymerization as soon as the conversion reaches 20–50%. The unconverted monomer can be used again. For this reason, it is preferable to carry out the polymerization continuously, separating the polymer and recycling the monomer, possibly after further additions of the catalyst.

Since it is known that organometallic and metal hydride compounds are sensitive to oxygen, carbon dioxide, water and other atmospheric agents, it is preferred to carry out the polymerization under a nitrogen atmosphere. Similarly, other operations connected wtih handling and preparing the catalytic mixture are also carried out under dry nitrogen.

The homopolymers of this invention have various applications in many areas, such as, elastomers, rubbers, expanded materials, thermosetting resins and plastics.

The elastomers obtained by vulcanization of the polymers of this invention have a high elastic modulus.

By the process of this invention it is also possible to prepare copolymers of cycloolefins with 7–12 carbon atoms in the ring, either with each other or with cyclopentene.

In order to determine the content of the different unsaturated monomeric units (e.g. cis heptenamer, trans heptenamer, cis octenamer, trans octenamer) in the polymer, the infrared absorption spectrum was used, by utilizing the following absorption coefficients:

cis heptenamer units
$$K_{7.1 \text{ microns}} = 0.93 \times 10^4 \text{ (moles} \times \text{cm.}^2/\text{g.})$$
cis octenamer units trans heptenamer units
$$K_{10.35 \text{ microns (molten)}} = 10 \times 10^4 \text{ (moles} \times \text{cm.}^2/\text{g.})$$
trans octenamer units The following examples are illustrations of this invention and it is not intended to be limited thereto.

EXAMPLE 1

The polymerization vessel consists of a flask provided with an agitator, a nitrogen inlet tube and an inlet tube for introducing the reactants.

A dry nitrogen atmosphere is formed in the flask and 10 ml. (84 millimols) of chromatographically pure cycloheptene are introduced.

After cooling to $-30°$ C., 2 millimols of tungsten hexachloride are added while agitating; 10 millimols of aluminum diethyl monochloride are then slowly added.

The monomer/tungsten molar ratio is 42:1, the aluminum/tungsten molar ratio is 5:1.

The polymer formation starts rather quickly, as can be seen from the increase in the viscosity of the mixture. After 3 hours the mixture is left to reach room temperature, at which it is kept for further 17 hours.

At this point the mass has a gel like consistency. The polymerization is stopped by adding 5 ml. of n-butanol containing 20 mg. of phenyl-beta-naphthylamine. The contents of the flask are poured into 10 ml. of methanol containing 5 ml. of 38% hydrochloric acid.

The polymer precipitated and dried under nitrogen is dissolved again in 20 ml. of methanol, the solution is filtered and poured again into 50 ml. of methanol containing 2 ml. of 38% hydrochloric acid.

The mother liquor is decanted, the polymer is suspended in fresh methanol, the suspension is filtered and the polymer is washed with further methanol containing 0.1% by weight of phenyl-beta-naphthylamine. The polymer is then dried under reduced pressure at room temperature.

0.7 g. (corresponding to a conversion of 9%) of a fibrous-rubbery non-tacky polymer are thus obtained. It has an intrinsic viscosity determined in toluene at 30° C. of 0.8 (100 ml./g.).

The polymer is soluble in aromatic hydrocarbons (such as benzene and toluene), naphthenic hydrocarbons (such as cyclohexene) and chlorinated hydrocarbons (such as carbon tetrachloride and chlorobenzene).

It is particularly soluble in aliphatic hydrocarbons (such as n-heptane) and insoluble in ketones (such as acetone and methyl-ethylketone) in alcohols (such as methanol and n-propanol) and in ethers (such as diethyl ether, tetrahydrofurane and dioxane).

The polymer has a typical infrared absorption spectrum in which characteristic bands can be observed.

An intense band at 10.35 microns which indicated the presence of trans double bonds in 95% proportion, as referred to the monomeric units present.

A weak band at 7.1 microns which indicates the presence of cis double bonds in 5% proportion, as referred to the monomeric units present.

Practical absence of bands attributable to other types of unsaturation (vinyl, vinylidene, allene, conjugated double bonds).

A band at 9.35 microns due to the structural regularity of the chains, showing crystallinity.

From the X-ray spectrum, registered on powders, a high degree of crystallinity is observed.

The main diffraction lines correspond to the following lattice distances and had the following relative intensities: 4.13 A. (s.s.), 3.72 A. (m.s.), 2.515 A. (m.), 2.217 A.

(w.), 2.067 A. (w); in which s.s.=very strong, m.s.=medium strong, m.=medium, and w.=weak.

A sample of fiber oriented by stretching and annealing, has a crystallographic identity period along the fiber axis of 17.0±0.3 A.

EXAMPLE 2

The polymerization is carried out as described in Example 1. The following reactants are used:

10 ml. (84 millimols) of pure cycloheptene
0.28 millimol of tungsten hexachloride
1.4 millimols of diethylaluminum monochloride The monomer/tungsten molar ratio is of 300:1, and the aluminum/tungsten molar ratio is of 5:1.

The polymerization temperature is −30° C. for 3 hours and then about 20° C. for 17 hours.

The polymer is purified and isolated as in Example 1. 1.9 g. (conversion of 23%) of a polymer similar to that of Example 1 are obtained. Its molecular weight however is higher: the intrinsic viscosity in toluene at 30° C. is 4.8 (100 ml./g.).

The polymer is a non-tacky elastomer. By X-ray examination it shows the same crystallinity as the polymer of Example 1.

The infrared spectrographic examination shows the presence of units of trans heptenamer in 96% proportion and of units of cis heptenamer in 4% proportion, calculated on the total monomer units.

Bands deriving from other types of unsaturations are practically absent.

EXAMPLE 3

The polymerization is carried out as described in Example 1. The following reactants are used:

10 ml. (84 millimols) of pure cycloheptene
2 millimols of tungsten hexachloride
5 millimols of triethyl aluminum The monomer/tungsten molar ratio is 42:1 and the aluminum/tungsten molar ratio is 2.5:1.

The polymerization temperature is −30° C. for 5 hours and then about 0° C. for 15 hours.

The polymer is purified and isolated as in Example 1. 0.8 g. (conversion of 10%) of a polymer similar to that of Example 1 is obtained. Its intrinsic viscosity in toluene is 1.1 (100 ml./g.).

The polymer is a fibrous elastic solid. It shows the same X-ray crystallinity described for the polymer of Example 1. The infrared spectrographic examination shows the presence of trans heptenamer units in 88% proportion and of cis heptenamer units in 12% proportion.

Bands deriving from other types of unsaturations are practically absent.

EXAMPLE 4

The polymerization is carried out as described in Example 1. The following reactants are used:

10 ml. (84 millimols) of pure cycloheptene
0.28 millimol of tungsten hexachloride
0.70 millimol of aluminum triethyl The monomer/tungsten molar ratio is 300:1, and the aluminum/tungsten molar ratio is 2.5:1.

The polymerization temperature is −30° C. for 6 hours and about 20° C. for 14 hours.

The polymer is purified and isolated as described in Example 1.

2.2 g. (conversion of 25%) of a polymer similar to that of Example 2 are obtained. Its intrinsic viscosity in toluene at 30° C. is 5.5 (100 ml./g.).

The polymer is a solid elastomer. It has the same X-ray crystallinity described for the polymer of Example 1.

The infrared spectrographic examination shows the presence of trans-heptanamer units in 80% proportion and of cis heptenamer units in 20% proportion.

Bands deriving from other types of unsaturations are practically absent.

EXAMPLE 5

The polymerization is carried out as described in Example 1. The following reactants are used:

10 ml. (84 millimols) of pure cycloheptene
2 millimols of tungsten hexachloride
2 millimols of aluminum triethyl The monomer/tungsten molar ratio is 42:1 and the aluminum/tungsten molar ratio is 1:1.

The polymerization temperature is −30° C. for 6 hours and about 20° C. for 14 hours.

The polymer is purified and isolated as described in Example 1.

1.65 g. (conversion of 20%) of a polymer similar to that of Example 1 are obtained. Its intrinsic viscosity in toluene at 30° C. is 0.4 (100 ml./g.)

The polymer is a slightly elastic powder. It has the same X-ray crystallinity described for the polymer of Example 1.

The infrared spectrographic examination shows the presence of trans heptenamer units in 91% proportion and of cis heptenamer units in 8% proportion.

Bands deriving from other types of unsaturations are practically absent.

EXAMPLE 6

The polymerization is carried out as described in Example 1. The following reactants are used:

10 ml. (84 millimols) of pure cycloheptene
2 millimols of tungsten hexachloride
6 millimols of aluminum tri-n-hexyl The monomer/tungsten molar ratio is 42:1, and the aluminum/tungsten molar ratio is 3:1.

The polymerization temperature is −30° C. for 5 hours and then about 20° C. for 15 hours.

The polymer is purified and isolated as in Example 1.

2.2 g. (conversion of 27%) of a polymer similar to that of Example 2 are obtained. Its intrinsic viscosity in toluene at 30° C. is 6.0 (100 ml./g.).

The polymer is a solid elastomer. It shows the same X-ray crystallinity described for the polymer of Example 1.

The infrared spectrum shows the presence of trans heptenamer units in 95% proportion and of cis heptenamer units in 5% proportion.

Bands deriving from other types of unsaturations are practically absent.

EXAMPLE 7

The polymerization is carried out as described in Example 1. The following reactants are used:

10 ml. (84 millimols) of pure cycloheptene
3 millimols of aluminum diisobutyl monohydride
1 millimol of tungsten hexachloride The monomer/tungsten molar ratio is 84:1 and the aluminum/tungsten molar ratio is 3:1.

The polymerization temperature is −30° C. for 5 hours and then about 20° C. for 15 hours.

The polymer is purified and isolated as described in Example 1.

0.7 g. (conversion of 9%) of a polymer similar to that of Example 1 are obtained. Its intrinsic viscosity in toluene at 30° C. is 0.8 (100 ml./g.).

The polymer is an elastic solid. It has the same type of X-ray crystallinity described for the polymer of Example 1.

The infrared spectrum shows the presence of trans heptenamer units in 80% proportion and of cis heptenamer units in 9% proportion while the remaining 11% consists of cyclic units deriving from the opening of the double bond.

EXAMPLE 8

The polymerization is carried out as described in Example 1. The following reactants are used:

10 ml. (84 millimols) of pure cycloheptene
2 millimols of molybdenum pentachloride
5 millimols of aluminum trihexyl The monomer/molybdenum molar ratio is 42:1 and the aluminum/molybdenum molar ratio is 2.5:1.

The polymerization temperature is —30° C. for 5 hours and then about 20° C. for further 25 hours.

The polymer is purified and isolated as described in Example 1.

0.4 g. (conversion of 5%) of a polymer similar to that of Example 1 are thus obtained. It has an intrinsic viscosity in toluene at 30° C. of 0.5 (100 cc./g.).

The polymer is a solid waxy product. It shows the same X-ray crystallinity as described for the polymer of Example 1.

The infrared spectrum shows the presence of trans heptenamer units in 95% proportion and of cis heptenamer units in 5% proportion.

Bands deriving from the other types of unsaturations are practically absent.

EXAMPLE 9

The polymerization is carried out as described in Example 1. Cyclooctene cis is used as the monomer instead of cycloheptene. The following reactants are used:

10 ml. (78 millimols) of purs cis cyclooctene
0.25 millimol of tungsten hexachloride
0.625 millimol of aluminum trihexyl The monomer/tungsten molar ratio is 310:1 and the aluminum/tungsten molar ratio is 2.5:1.

The polymerization temperature is —30° C. for 3 hours and then about 20° C. for further 17 hours.

The polymer is purified and isolated as described in Example 1. 2.8 g. (conversion of 32%) of a solid rubbery non-tacky polymer are thus obtained. It has an intrinsic viscosity in toluene at 30° C. of 5.5 (100 ml./g.).

The polymer is soluble in aromatic and naphthenic hydrocarbons (such as benzene, toluene and cyclohexene) and in chlorinated hydrocarbons (carbon tetrachloride and chlorobenzene). It is partially soluble in aliphatic hydrocarbons (such as n-heptane) and is insoluble in alcohols (such as methanol), ketones (such as acetone and methylethylketone) and in ethers (such as diethyl ether).

The polymer has a typical infrared absorption spectrum in which the following characteristic band can be observed:

An intense band at 10.35 microns which shows the presence of trans double bonds in 88% proportion, referred to the monomeric units present.

A weak band at 7.1 microns which shows the presence of cis double bonds in 12% proportion, referred to the monomeric units present.

Practical absence of bands deriving from other types of unsaturations (vinyl, vinylidene, allene, conjugated double bonds, etc.).

A band at about 9.35 microns due to the structural regularity of the chains, indicating thus the crystallinity.

From the X-ray spectrum, registered on powders, a high degree of crystallinity is observed. The main reflections correspond to lattice distances of: 4.37 A. (m.s.), 4.13 A. (w.), 3.80 A. (m.); in which m.s.=medium strong, w.=weak, m.=medium.

A sample of fiber oriented by stretching and annealed, indicates a crystallographic identity period along the fiber axis of 9.9±0.3 A.

EXAMPLE 10

The polymerization of cis cyclooctene is carried out as described in Example 1 for cycloheptene. The following reactants are used:

10 ml. (78 millimols) of cis cyclooctene
1 millimol of tungsten hexachloride
5 millimols of aluminum diethyl monochloride The monomer to tungsten molar ratio is 78:1; the tluminum to tungsten molar ratio is 5:1.

The polymerization temperature is —15° C. for 5 hours and then about 20° C. for further 15 hours.

The polymer is purified and isolated as in Example 1.

0.6 g. (conversion of 8%) of a polymer similar to that of Example 1 are obtained. It has an intrinsic viscosity in toluene at 30° C. of 1.8 (100 ml./g.).

The polymer is an elastic crystalline solid.

The infrared spectrum shows the presence of trans octenamer units in 52% proportion and of cis octenamer units in 48% proportion.

Bands deriving from other types of unsaturations are practically absent.

EXAMPLE 11

The polymerization of cis-cyclooctene is carried out as described in Example 1 for cycloheptene. The following reactants are used:

10 ml. (78 millimols) of cis cyclooctene
1 millimol of molybdenum pentachloride
3 millimols of aluminum triethyl The monomer/molybdenum molar ratio is 78:1 and the aluminum/molybdenum molar ratio is 3:1.

The polymerization temperature is —15° C. for 7 hours and then about 20° C. for further 13 hours.

The polymer is purified and isolated as in Example 1.

0.2 g. (conversion of 3%) of a polymer similar to that of Example 10 are obtained. It has an intrinsic viscosity in toluene at 30° C. of 0.4 (100 ml./g.).

The polymer is a waxy crystalline solid.

The infrared spectrum shows the presence of trans octenamer units in 46% proportion and of cis octenamer units in 54% proportion.

Bands deriving from other types of unsaturations are practically absent.

EXAMPLE 12

The polymerization of cis cyclooctene is carried out as described in Example 1 for cycloheptene. The following reactants are used:

10 ml. (78 millimols) of cis cyclooctene
0.26 millimol of tungsten hexachloride
0.78 millimol of beryllium diethyl The monomer/tungsten molar ratio is 310:1 and the beryllium/tungsten molar ratio is 3:1.

The polymerization temperature is —30° C. for 5 hours and then about 20° C. for further 15 hours.

The polymer is purified and isolated as in Example 1.

0.4 g. (conversion of 5%) of a polymer similar to that of Example 10 are obtained. It has an intrinsic viscosity in toluene at 30° C. of 0.4 (100 ml./g.).

The polymer is a waxy crystalline solid.

The infrared spectrum shows the presence of trans octenamer in 60% proportion and of cis octenamer units in 40% proportion.

Bands deriving from other types of unsaturations are practically absent.

EXAMPLE 13

The polymerization of cis cyclooctene is carried out as described in Example 1 for cycloheptene. The following reactants are used:

10 ml. (78 millimols) of cis cyclocetene
3.9 millimols of tungsten hexachloride 11.7 millimols of aluminum triethyl
10 cc. of anhydrous toluene The monomer/tungsten molar ratio is 20:1 and the aluminum/tungsten molar ratio is 3:1.

In distinction from Example 1, the catalyst is prepared in a separate vessel by mixing at −30° C. under nitrogen tungsten hexachloride dissolved in toluene with aluminum triethyl.

As soon as it is prepared the catalyst is siphoned into the other flask containing cis cycloocetene cooled to −30° C.

The procedure of Example 1 is then adopted. The polymerization temperature is −30° C. for 5 hours and then about 20° C. for further 15 hours.

1.2 g. (conversion of 14%) of a polymer similar to that of Example 10 are obtained. The polymer is an elastic solid having the same type of X-ray crystallinity described for the polymer of Example 10.

The infrared spectrum shows the presence of trans octenamer units in 70% proportion and of cis octenamer units in 30% proportion.

Bands deriving from other types of unsaturations are practically absent.

EXAMPLE 14

The polymerization is carried out as described in Example 1 by using the following reactants.

1 cc. of toluene
10.5 cc. (79 millimols) of pure cycloocetene
0.132 millimol of tungsten oxychloride ($WOCl_4$)
0.66 millimol of aluminum diethyl monochloride The monomer/tungsten molar ratio is 600:1 and the aluminum/tungsten molar ratio is 5:1.

The polymerization is carried out at the temperature of −30° C. for about 20 hours.

The polymer is purified and isolated as described in Example 1. The product obtained is a non-tacky solid and amounts to 0.9 g. (conversion of 10%).

The infrared spectrographic examination shows the presence of 10% of trans octenamer units and 90% of cis octenamer units.

Bands of other types of unsaturations are practically absent.

EXAMPLE 15

The polymerization is carried out as described in Example 1 by using the following reactants:

4 cc. of toluene
13.7 cc. (70.5 millimols) of cyclododecene (containing 60% of trans and 40% of cis molecules)
0.141 millimol of $WCl_6$
0.71 millimol of $Al(C_2H_5)_2Cl$ The monomer/tungsten molar ratio is 500:1 and the aluminum tungsten molar ratio is 5:1.

The polymerization is carried out at −40° C. for 17 hours and at −20° C. for 6 hours.

The polymer is purified and isolated as described in Example 1. 1.2 g. (conversion of 10%) of a solid elastic polymer are obtained.

The infrared spectrum shows the presence of 90% of trans dodecenamer units and 10% of cis dodecenamer units.

Bands of other types of unsaturations are practically absent. By X-rays examination the polymer appears to be crystalline and shows the most intense diffraction peak at an angle $2\sigma = 21.3°$ corresponding to a lattice distance of 4.17 A.

EXAMPLE 16

The polymerization is carried out as descibed in Example 1. The following reactants are used:

10 ml. (84 millimols) of pure cycloheptene
0.42 millimol of aluminum diethyl monochloride
0.084 millimol of tungsten hexachloride The monomer/tungsten molar ratio is 1,000:1 and the aluminum/tungsten molar ratio is 5:1.

The polymerization temperature is about −20° C. for 40 hours.

The polymer is purified and isolated as described in Example 1.

2.2 g. (conversion of 27%) of a polymer similar to that of Example 2 are obtained. Its intrinsic viscosity in toluene at 30° C. is 6.0 (100 ml./g.).

The polymer is a solid elastomer. It has the same type of X-ray crystallinity described for the polymer of Example 1.

The infrared spectrum shows the presence of trans heptenamer units in the proportion of 95% and of cis heptenamer units in the proportion of 5%.

Bands deriving from other types of unsaturation are practically absent.

While the present invention has been described with particular reference to specific examples, it is not to be limited thereby, but reference is to be had to the appended claims for a definition of its scope.

What is claimed is:

1. High molecular weight homopolymers of cycloolefins containing 7 to 12 carbon atoms in the ring, said homopolymers being characterized in having the structure of polyalkenamers in which the double bonds are substantially of the trans type, and in being crystalline under normal conditions without having been mechanically treated to induce crystallization.

2. High molecular weight homopolymers of cyclooctene characterized in having the structure of polyoctenamers in which the double bonds are substantially of the trans type, and in being crystalline under normal conditions without having been mechanically treated to induce crystallization.

3. High molecular weight homopolymers of cycloheptene, said homopolymers being characterized in having the structure of polyheptenamers in which the double bonds are substantially of the trans type, and in being crystalline under normal conditions without having been mechanically treated to induce crystallization.

4. High molecular weight homopolymers of cyclododecene, said homopolymers being characterized in having the structure of poly-dodecenamers in which the double bonds are substantially of the trans type, and in being crystalline under normal conditions without having been mechanically treated to induce crystallization.

5. A process for preparing high molecular weight, linear, head to tail homopolymers of cycloolefins containing from 7 to 12 carbon atoms in the ring, said homopolymers being characterized in having the structure of polyalkenamers, which comprises polymerizing the cycloolefin in contact with a catalyst obtained by mixing a transition metal salt selected from the group consisting of tungsten and molybdenum halides and oxyhalides with an organometallic compound or hydride of an element of Group II and III of the Periodic Table, at a temperature between −80° C., and +100° C.

6. The process of claim 5, wherein the temperature is from about −50° C. to +30° C.

7. The process according to claim 5, in which the tungsten salt is tungsten hexachloride.

8. The process according to claim 5, in which the tungsten salt is tungsten oxychloride.

9. The process according to claim 5, in which the organometallic or metalhydride metal is beryllium.

10. The process according to claim 5, in which the organometallic or metalhydride metal is magnesium.

11. The process according to claim 5, in which the organometallic or metalhydride metal is calcium.

12. The process according to claim 5, in which the organometallic or metalhydride metal is zinc.

13. The process according to claim 5, in which the organometallic or metalhydride metal is aluminum.

14. The process according to claim 9, in which the beryllium is beryllium diethyl.

15. The process according to claim 13, in which the aluminum is aluminum diethyl monochloride.

16. The process according to claim 13, in which the aluminum is aluminum triethyl.

17. The process according to claim 13, in which the aluminum is aluminum trihexyl.

18. The process according to claim 13, in which the aluminum is aluminum diisobutyl hydride.

19. The process according to claim 5, in which the organometallic or metalhydride compound is a metal selected from the group consisting of beryllium, magnesium, calcium zinc and aluminum.

20. The process according to claim 5, in which the organometallic or metalhydride compound is selected from the group consisting of aluminum diethyl monochloride, aluminum triethyl, aluminum trihexyl, aluminum diisobutyl hydride and beryllium diethyl.

21. The process according to claim 5, in which the ratio of transition metal salt to organometallic or metalhydride compound is between 1:0.2 and 1:100.

22. The process according to claim 5, in which the molar ratio of cycloolefin to transition metal is up to about 3000:1.

23. The process according to claim 10, characterized in that it is carried out in the absence of inert diluents, by preparing the catalyst in the presence of the monomer.

24. The high molecular weight homopolymers of claim 1 vulcanized to elastomeric materials.

References Cited

UNITED STATES PATENTS 3,074,918  1/1963  Eleuterio _____ 260—93.1

JOSEPH L. SCHOFER, Primary Examiner

R. A. GAITHER, Assistant Examiner